United States Patent [19]

Iijima

[11] 3,913,140

[45] Oct. 14, 1975

[54] TRACK INDEXING INDICATOR FOR A TAPE PLAYER

[75] Inventor: Tadashi Iijima, Zushi, Japan

[73] Assignee: Alps Motorola, Inc., Tokyo, Japan

[22] Filed: Oct. 15, 1971

[21] Appl. No.: 189,766

Related U.S. Application Data

[63] Continuation of Ser. No. 839,872, July 8, 1969.

[52] U.S. Cl. .................... 360/106; 360/78; 360/109

[51] Int. Cl.$^2$ .................... G11B 5/55

[58] Field of Search ........ 179/100.2 MD, 100.2 CA, 179/100.2 R, 100.2 S, 100.2 Z; 274/4 A; 200/11 D; 360/106, 109, 78

[56] References Cited

UNITED STATES PATENTS

| | | | |
|---|---|---|---|
| 2,468,198 | 4/1949 | Heller | 179/100.2 MD |
| 2,896,033 | 6/1959 | Hartz | 200/11 D |
| 3,248,720 | 4/1966 | Thumin | 179/100.2 S |
| 3,429,578 | 2/1969 | Furuichi | 179/100.2 CA |
| 3,450,409 | 6/1969 | Pitzer | 274/4 A |
| 3,477,725 | 11/1969 | Housman | 179/100.2 R |
| 3,572,723 | 3/1971 | Jenkins et al. | 179/100.2 Z |

*Primary Examiner*—Alfred H. Eddleman
*Attorney, Agent, or Firm*—James W. Gillman; Donald J. Lisa

[57] ABSTRACT

A track indicating device for a tape player indicates, by appropriate pilot lights, which track is recording or playing. Circuits for completing the energizing paths for the individual pilot lights associated with each track are completed through a switch mechanism carried by the cam used to position the tape head.

4 Claims, 2 Drawing Figures

Inventor
Tadashi Iijima
BY
Mueller, Aichele & Rauner
ATTYS.

TRACK INDEXING INDICATOR FOR A TAPE PLAYER

This is a continuation of application Ser. No. 839,872, filed July 8, 1969.

BACKGROUND OF THE INVENTION

The use of multi-track recording tape (having four or eight tracks) provides an economical method for recording or playing tapes for extended times. It is desirable however to provide a means for indicating which of the tracks on the tape is being used for recording or playback in order that the desired track may be selected by the operator of the recording or playback device.

SUMMARY OF THE INVENTION

Accordingly, it is an object of this invention to indicate which of the tracks on a multi-track recording tape is re-recording or playing.

It is an additional object of this invention to indicate by pilot lights the track of a multi-track recording tape which is being recorded upon or which is being reproduced by a playback mechanism.

It is a further object of this invention to close the circuit path for a pilot light, indicating the particular track of a multi-track recording tape which is being recorded upon or played back, by means of a switch mechanism operated by the cam used to position the head of a multi-track tape player or recorder.

In accordance with a preferred embodiment of this invention an appropriate indicating lamp associated with the particular track to which the head of a multi-track tape recorder or playback mechanism is positioned is energized by closing a circuit path under the control of the cam used to position the tape playback or recording head.

DETAILED DESCRIPTION

Figure 1:
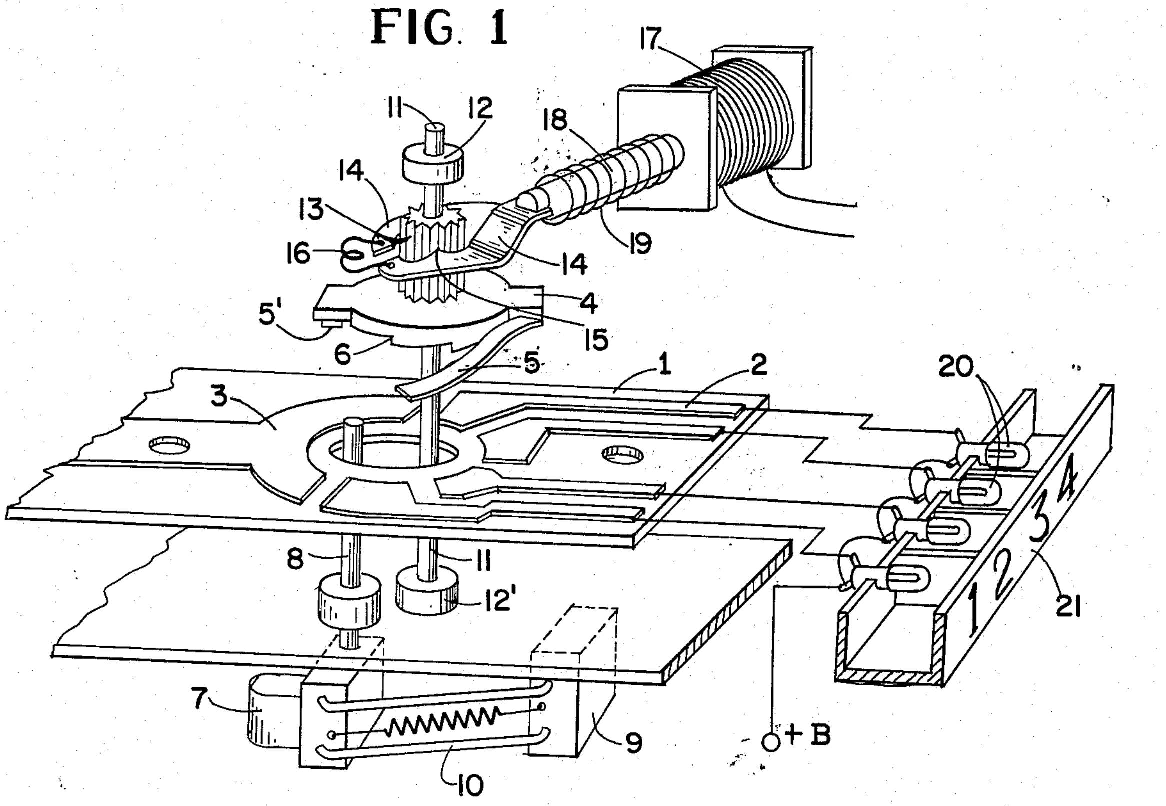
FIG. 1 is a partially exploded view of a preferred embodiment of this invention.

Referring now to the drawing, in which like reference numerals are used in both views to designate the same or similar elements, there is shown a track indicating device for indicating which of the tracks on a multi-track recording tape is recording or playing. In a preferred embodiment of the invention, the indication is provided by appropriate pilot lights. The pilot light indication is easy to recognize, the track indicating device mechanism is straightforward, and the electrical circuit is simplified by use of a printed circuit base board.

The contact points 2 for controlling the indicator lights 20 and the ground terminal 3 for the contact points are printed on a printed circuit base board 1. The printed circuit base board 1 may be any suitable printed circuit board of a type conventionally used. Battery is provided in common to each of the four indicator lamps 20 associated with the four sets of tracks on the recording tape, with the other terminal for each of the lamps 20 being connected to a different one of the contact points 2, which are circularly arranged. The ground terminal 3 is located on the opposite side of the circle from the contact points 2, and a pair of diametrically opposed contact brushes 5, 5' are carried by the head positioning cam 4, the lower surface of which has a series of inverted steps or cam surfaces 6.

In FIG. 1, the cam 4 and the brushes 5, 5' are shown spaced from the circuit board 1 and the contact points 2 and the ground terminal 3. In actual operation of the device, however, the brushes 5 and 5' ride on the enlarged areas of the contact points 2 and the curved area of the ground terminal 3, and are rotated with the cam 4. Because the brushes 5, 5' are symmetrically attached to the cam 4 on opposite sides, even cam balance is maintained and one-sided wear of the contact points and the ground terminal is prevented. The cam 4 is made of conductive material to complete a conductive path between the brushes 5 and 5'.

A head positioning cam follower rod 8 is provided for positioning the tape track recording or pickup head 7 and operates in a conventional manner to position the head to one of the four sets of tracks corresponding to a particular one of the cam surfaces on the cam 4. A supporting block 9 is attached to the lower frame of the tape playing or recording device and supports the head 7 for vertical movement through connecting supports 10 which interconnect the head 7 and the supporting block 9.

The cam 4 is rotated about a cam shaft 11, preferably made of non-conductive material and supported in the frame of the tape recorder or player. Vertical movement of the shaft 11 is restricted by a pair of flanges 12 and 12' located at the upper and lower ends, respectively, of the shaft 11. A ratchet gear 13 is attached to the cam 4 for rotation therewith and is moved in predetermined increments by a driving pawl 15 which is carried by an arm 14. The ratchet gear 13 is held to a particular position to which it has been moved by a detent pawl (not shown in FIG. 1) which also is carried by an arm 14', pivotally connected to the arm 14 at the rightmost end shown in FIG. 1. The other ends of the arms 14 and 14' are interconnected by a spring 16 which biases the driving pawl 15 and the detent pawl into engagement with the ratchet gear 13. In order to rotate the cam 4 to the next predetermined position, an electromagnet 17 is energized to cause the armature 18 connected to the pivoted end of the arms 14 and 14' to be drawn into the electromagnet 17. The armature 18 is returned by a coil spring 19 after current through the coil of the electromagnet 17 is cut off. This operation completes one step of rotation of the cam 4.

When it is desired to change the track of the tape which is being played back or recorded upon, the electromagnet 17 is momentarily energized by closure of a switch (not shown) followed by its subsequent opening. This causes the armature 18 to be drawn into the coil 17 of the electromagnet and the driving pawl 15 attached to the arm 14 revolves the ratchet gear 13 counter-clockwise by one gear tooth. When the current through the electromagnet 17 is cut off, the pawl 15 is pushed back by the coil spring 19; but at the same time, the clockwise movement of the ratchet gear 13 is prevented by the detent pawl carried on the arm 14'. Consequently, the driving pawl 15 slides to the next gear tooth.

The result of the movement of this on-off operation is to move both the ratchet gear 13 and the cam 4, which is attached to the ratchet gear 13, one gear tooth counter-clockwise. This in turn presents a different step 6 to the cam follower 8 which transfers the motion to the head 7, moving the head upward or downward to the next track position in accordance with the surface 6 which is presented to the cam follower 8.

Figure 2:
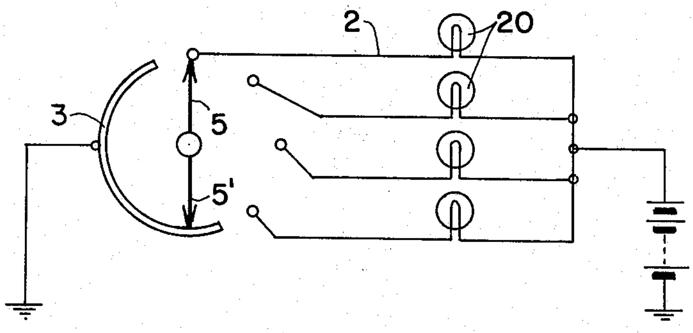
FIG. 2 is a schematic circuit diagram of the electrical circuit controlled by the apparatus shown in FIG. 1.

At the same time, the movement of the cam 4 changes the contact points of the contact brushes 5, 5', which in turn causes a circuit to be completed for the next corresponding pilot light 20. From an examination of FIG. 2, it can be seen that each different rotational step imparted to the cam 4 causes the contact brush 5 to move to a different contact point 2 associated with a different lamp 20 indicative of the corresponding track or set of tracks to which the head 7 has been positioned by the cam 4. The cam 4 may be provided with two sets of 4 different cam surfaces 6, so that each 180° of rotation presents each of the four positions to the cam-follower 8. The brushes 5, 5' for the second 180° rotation are reversed from the positions shown in the drawing, but one or the other of the brushes 5, 5' is always touching the ground terminal 3. This makes the circuit stable.

I claim:

1. In a multi-track tape recording or reproducing device in which the recording or reproducing head is positioned adjacent predetermined ones of the tracks by a cam follower controlled by a head positioning cam having a plurality of cam surfaces corresponding to the different tracks to which the head may be positioned, a track position indicating apparatus including in combination:

a plurality of electrical indicating devices equal in number to the number of positions to which the head can be positioned;

switch means connected in an energizing circuit for each of the indicating devices;

switch operating means carried by said head positioning cam for movement therewith, said switch operating means cooperating with a selected switch means corresponding to the particular indicating device for the head position selected by the position of the cam to thereby complete an energizing circuit for the selected indicating device.

2. The combination according to claim 1 wherein the switch means for completing the circuits to the indicating devices are in the form of switch contacts on a printed circuit board mounted in close proximity to said cam, the positions of the contacts on the printed circuit board corresponding to different positions to which the cam may be moved.

3. The combination according to claim 2 wherein the cam is mounted for rotation about a shaft and wherein the printed circuit board has an opening therein for permitting passage of the cam shaft therethrough, with the contacts being located in a circular path about said opening and wherein said switch operating means carried by the cam is in the form of a pair of brushes mounted on the cam and located to cooperate with the contacts on the printed circuit board.

4. The combination according to claim 3 wherein the cam follower extends through the opening in the printed circuit board to engage the cam and wherein the contacts on the printed circuit board include a common contact for the circuits of all of the indicating devices and individual contacts associated with each one of the indicating devices, with one of the brushes contacting the common contact and the other of the brushes contacting one of the individual contacts on the printed circuit board for each of the positions to which the cam may be rotated for positioning the tape head.

* * * * *